United States Patent [19]

Kumagai

[11] Patent Number: 5,034,992

[45] Date of Patent: Jul. 23, 1991

[54] IMAGE PROCESSING METHOD

[75] Inventor: Ryohei Kumagai, Tokyo, Japan

[73] Assignee: Ezel, Inc., Tokyo, Japan

[21] Appl. No.: 347,034

[22] Filed: May 4, 1989

[30] Foreign Application Priority Data

May 27, 1988 [JP] Japan .................................. 63-129953

[51] Int. Cl.$^5$ ............................................... G06K 9/36
[52] U.S. Cl. .......................................... 382/54; 382/55
[58] Field of Search ............................... 382/53, 54, 55

[56] References Cited

U.S. PATENT DOCUMENTS

| | | | |
|---|---|---|---|
| 4,646,355 | 2/1987 | Petrick et al. ......................... | 382/54 |
| 4,809,343 | 2/1989 | Wahabayashi et al. ............... | 382/27 |
| 4,823,194 | 4/1989 | Mishima et al. ...................... | 358/282 |
| 4,853,970 | 8/1989 | Ott et al. .............................. | 382/54 |

Primary Examiner—Leo H. Boudreau
Assistant Examiner—Andrew W. Johns
Attorney, Agent, or Firm—Cushman, Darby & Cushman

[57] ABSTRACT

An image processing method produces a density weighted or unweighted distance transformation of an image. An original image is stored. When a background density is lower than a configuration density, an index image is generated by replacing pixels having a configuration density with a first selected value and other pixels with a zero value. A first image transformed is generated by replacing pixels in the index image with the minimum value of surrounding pixels in a neighborhood. A first addition-fixed image is generated by adding pixels values of the transformed image to corresponding pixel values of the original image. A second transformed image is generated by replacing pixels in the addition-fixed image with a minimum value of surrounding pixels in a neighborhood, and a second addition-fixed image is generated by adding pixel values of the second transformed image to corresponding pixel values of the original image. A plurality of transformed and addition-fixed images may be generated until an addition-fixed image is substantially identical to a previously generated addition-fixed image.

11 Claims, 15 Drawing Sheets

| | | | | | | | | |
|---|---|---|---|---|---|---|---|---|
| | 10 | 6 | 5 | 8 | 7 | 8 | 8 | 7 |
| | 8 | 14 | 13 | 15 | 10 | 14 | 15 | 7 |
| | 10 | 21 | 14 | 14 | 15 | 14 | 12 | 6 |
| 4 | 12 | 19 | 14 | 12 | 7 | 9 | 7 | 6 | 6 |
| 8 | 13 | 21 | 18 | 11 | 3 | | | | |
| 10 | 16 | 25 | 13 | 11 | 8 | | | | |
| 6 | 13 | 20 | 18 | 18 | 9 | | | | |
| 10 | 16 | 25 | 26 | 19 | 9 | | | | |
| 8 | 14 | 16 | 17 | 18 | 13 | 6 | 8 | 6 | 4 |
| 6 | 7 | 7 | 9 | 9 | 5 | 8 | 9 | 6 | 9 |

Scan Direction

FIG. 5

|    |    | 10 | 6 | 5 | 8 | 7 | 8 | 8 | 7 |
|----|----|----|---|---|---|---|---|---|---|
|    |    | 8  |   |   |   |   |   |   | 7 |
|    |    | 10 |   |   |   |   |   |   | 6 |
| 4  | 12 |    |   |   |   |   | 9 | 7 | 6 | 6 |
| 8  |    |    |   |   |   | 3 |
| 10 |    |    |   |   |   | 8 |
| 6  |    |    |   |   |   | 9 |
| 10 |    |    |   |   |   | 9 |
| 8  |    |    |   |   |   | 6 | 8 | 6 | 4 |
| 6  | 7  | 7  | 9 | 9 | 5 | 8 | 9 | 6 | 9 |

FIG. 6

|   |   | 0  | 0 | 0 | 0 | 0 | 0 | 0 | 0 |
|---|---|----|---|---|---|---|---|---|---|
|   |   | 0  | 6 | 5 | 8 | 7 | 8 | 7 | 0 |
|   |   | 0  | 10|   |   | 9 | 7 | 6 | 0 |
| 0 | 0 | 10 |   |   | 3 | 0 | 0 | 0 | 0 |
| 0 | 8 |    |   | 3 | 0 |
| 0 | 10|    |   | 8 | 0 |
| 0 | 8 |    |   | 9 | 0 |
| 0 | 10|    |   | 9 | 0 |
| 0 | 7 | 7  | 9 | 9 | 5 | 0 | 0 | 0 | 0 |
| 0 | 0 | 0  | 0 | 0 | 0 | 0 | 0 | 0 | 0 |

FIG. 7

| 10 | 6 | 5 | 8 | 7 | 8 | 8 | 7 |
|----|----|----|----|----|----|----|----|
| 8 | 14 | 13 | 15 | 10 | 14 | 15 | 7 |
| 10 | 21 | | | 15 | 14 | 12 | 6 |

| 4 | 12 | 19 | | | 7 | 9 | 7 | 6 | 6 |
|----|----|----|----|----|----|----|----|----|----|
| 8 | 13 | | | 11 | 3 | | | | |
| 10 | 16 | | | 11 | 8 | | | | |
| 6 | 13 | | | 18 | 9 | | | | |
| 10 | 16 | | | 19 | 9 | | | | |
| 8 | 14 | 16 | 17 | 18 | 13 | 6 | 8 | 6 | 4 |
| 6 | 7 | 7 | 9 | 9 | 5 | 8 | 9 | 6 | 9 |

FIG. 8

| 0 | 0 | 0 | 0 | 0 | 0 | 0 | 0 |
|----|----|----|----|----|----|----|----|
| 0 | 6 | 5 | 8 | 7 | 8 | 7 | 0 |
| 0 | 10 | 13 | 7 | 9 | 7 | 6 | 0 |

| 0 | 0 | 10 | 19 | 7 | 3 | 0 | 0 | 0 | 0 |
|----|----|----|----|----|----|----|----|----|----|
| 0 | 8 | 13 | 11 | 3 | 0 | | | | |
| 0 | 10 | 16 | 11 | 8 | 0 | | | | |
| 0 | 6 | 13 | 18 | 9 | 0 | | | | |
| 0 | 10 | 16 | 17 | 9 | 0 | | | | |
| 0 | 7 | 7 | 9 | 9 | 5 | 0 | 0 | 0 | 0 |
| 0 | 0 | 0 | 0 | 0 | 0 | 0 | 0 | 0 | 0 |

FIG. 9

|    |    | 10 | 6  | 5  | 8  | 7 | 8 | 8 | 7 |
|----|----|----|----|----|----|---|---|---|---|
|    |    | 8  | 14 | 13 | 15 | 10| 14| 15| 7 |
|    |    | 10 | 21 | 15 | 14 | 15| 14| 12| 6 |
| 4  | 12 | 19 | 21 | 12 | 7  | 9 | 7 | 6 | 6 |
| 8  | 13 | 21 | 18 | 11 | 3  |   |   |   |   |
| 10 | 16 | 28 | 13 | 11 | 8  |   |   |   |   |
| 6  | 13 | 20 | 23 | 18 | 9  |   |   |   |   |
| 10 | 16 | 25 | 26 | 19 | 9  |   |   |   |   |
| 8  | 14 | 16 | 17 | 18 | 13 | 6 | 8 | 6 | 4 |
| 6  | 7  | 7  | 9  | 9  | 5  | 8 | 9 | 6 | 9 |

FIG. 10

|   |   | 0 | 0  | 0  | 0 | 0 | 0 | 0 | 0 |
|---|---|---|----|----|---|---|---|---|---|
|   |   | 0 | 6  | 5  | 8 | 7 | 8 | 7 | 0 |
|   |   | 0 | 10 | 12 | 7 | 9 | 7 | 6 | 0 |
| 0 | 0 | 10| 12 | 11 | 3 | 0 | 0 | 0 | 0 |
| 0 | 8 | 13| 11 | 3  | 0 |   |   |   |   |
| 0 | 10| 13| 11 | 8  | 0 |   |   |   |   |
| 0 | 6 | 13| 13 | 9  | 0 |   |   |   |   |
| 0 | 10| 16| 17 | 9  | 0 |   |   |   |   |
| 0 | 7 | 7 | 9  | 9  | 5 | 0 | 0 | 0 | 0 |
| 0 | 0 | 0 | 0  | 0  | 0 | 0 | 0 | 0 | 0 |

FIG. 11

| 10 | 6 | 5 | 8 | 7 | 8 | 8 | 7 |
|----|----|----|----|----|----|----|----|
| 8 | 14 | 13 | 15 | 10 | 14 | 15 | 7 |
| 10 | 21 | 14 | 14 | 15 | 14 | 12 | 6 |

| 4 | 12 | 19 | 14 | 16 | 7 | 9 | 7 | 6 | 6 |
|----|----|----|----|----|----|----|----|----|----|
| 8 | 13 | 21 | 18 | 11 | 3 | | | | |
| 10 | 16 | 25 | 13 | 11 | 8 | | | | |
| 6 | 13 | 20 | 18 | 18 | 9 | | | | |
| 10 | 16 | 25 | 26 | 19 | 9 | | | | |
| 8 | 14 | 16 | 17 | 18 | 13 | 6 | 8 | 6 | 4 |
| 6 | 7 | 7 | 9 | 9 | 5 | 8 | 9 | 6 | 9 |

FIG. 12

| 0 | 0 | 0 | 0 | 0 | 0 | 0 | 0 |
|----|----|----|----|----|----|----|----|
| 0 | 6 | 5 | 8 | 7 | 8 | 7 | 0 |
| 0 | 10 | 14 | 7 | 9 | 7 | 6 | 0 |

| 0 | 0 | 10 | 16 | 7 | 3 | 0 | 0 | 0 | 0 |
|----|----|----|----|----|----|----|----|----|----|
| 0 | 8 | 13 | 11 | 3 | 0 | | | | |
| 0 | 10 | 13 | 11 | 8 | 0 | | | | |
| 0 | 6 | 13 | 13 | 9 | 0 | | | | |
| 0 | 10 | 16 | 17 | 9 | 0 | | | | |
| 0 | 7 | 7 | 9 | 9 | 5 | 0 | 0 | 0 | 0 |
| 0 | 0 | 0 | 0 | 0 | 0 | 0 | 0 | 0 | 0 |

FIG. 13

|    |    |    | 10 | 8  | 5  | 8  | 7  | 8 | 8 | 7 |
|----|----|----|----|----|----|----|----|---|---|---|
|    |    |    | 8  | 14 | 13 | 15 | 10 | 14| 15| 7 |
|    |    |    | 10 | 21 | 16 | 14 | 15 | 14| 12| 6 |
| 4  | 12 | 19 | 16 | 12 | 7  | 9  | 7  | 6 | 6 |   |
| 8  | 13 | 21 | 18 | 11 | 3  |    |    |   |   |   |
| 10 | 16 | 25 | 13 | 11 | 8  |    |    |   |   |   |
| 6  | 13 | 20 | 18 | 18 | 9  |    |    |   |   |   |
| 10 | 16 | 25 | 25 | 19 | 9  |    |    |   |   |   |
| 8  | 14 | 16 | 17 | 18 | 13 | 6  | 8  | 6 | 4 |   |
| 6  | 7  | 7  | 9  | 9  | 5  | 8  | 9  | 6 | 9 |   |

FIG. 14

|   |   |    | 0  | 0  | 0 | 0 | 0 | 0 | 0 | 0 |
|---|---|----|----|----|---|---|---|---|---|---|
|   |   |    | 0  | 6  | 5 | 8 | 7 | 8 | 7 | 0 |
|   |   |    | 0  | 10 | 12| 7 | 9 | 7 | 6 | 0 |
| 0 | 0 | 10 | 12 | 7  | 3 | 0 | 0 | 0 | 0 |   |
| 0 | 8 | 13 | 11 | 3  | 0 |   |   |   |   |   |
| 0 | 10| 13 | 11 | 8  | 0 |   |   |   |   |   |
| 0 | 6 | 13 | 13 | 9  | 0 |   |   |   |   |   |
| 0 | 10| 16 | 17 | 9  | 0 |   |   |   |   |   |
| 0 | 7 | 7  | 9  | 9  | 5 | 0 | 0 | 0 | 0 |   |
| 0 | 0 | 0  | 0  | 0  | 0 | 0 | 0 | 0 | 0 |   |

FIG. 15

|    |    |    | 10 | 6  | 5  | 8  | 7  | 8  | 8  | 7 |
|----|----|----|----|----|----|----|----|----|----|---|
|    |    |    | 8  | 14 | 13 | 15 | 10 | 14 | 15 | 7 |
|    |    |    | 10 | 21 | 14 | 14 | 15 | 14 | 12 | 6 |
| 4  | 12 | 19 | 14 | 12 | 7  | 9  | 7  | 6  | 6  |   |
| 8  | 13 | 21 | 18 | 11 | 3  |    |    |    |    |   |
| 10 | 16 | 25 | 13 | 11 | 8  |    |    |    |    |   |
| 6  | 13 | 20 | 18 | 18 | 9  |    |    |    |    |   |
| 10 | 16 | 25 | 26 | 19 | 9  |    |    |    |    |   |
| 8  | 14 | 16 | 17 | 18 | 13 | 6  | 8  | 6  | 4  |   |
| 6  | 7  | 7  | 9  | 9  | 5  | 8  | 9  | 6  | 9  |   |

FIG. 16

|   |   |    | 0  | 0  | 0 | 0 | 0 | 0 | 0 | 0 |
|---|---|----|----|----|---|---|---|---|---|---|
|   |   |    | 0  | 6  | 5 | 8 | 7 | 8 | 7 | 0 |
|   |   |    | 0  | 10 | 12| 7 | 9 | 7 | 6 | 0 |
| 0 | 0 | 10 | 12 | 7  | 3 | 0 | 0 | 0 | 0 |   |
| 0 | 8 | 13 | 11 | 3  | 0 |   |   |   |   |   |
| 0 | 10| 13 | 11 | 8  | 0 |   |   |   |   |   |
| 0 | 6 | 13 | 13 | 9  | 0 |   |   |   |   |   |
| 0 | 10| 16 | 17 | 9  | 0 |   |   |   |   |   |
| 0 | 7 | 7  | 9  | 9  | 5 | 0 | 0 | 0 | 0 |   |
| 0 | 0 | 0  | 0  | 0  | 0 | 0 | 0 | 0 | 0 |   |

FIG. 17

|    |    | 10 | 6  | 5  | 8  | 7  | 8  | 8 | 7 |
|----|----|----|----|----|----|----|----|----|----|
|    |    | 8  | 14 | 13 | 15 | 10 | 14 | 15 | 7 |
|    |    | 10 | 21 | 14 | 14 | 15 | 14 | 12 | 6 |
| 4  | 12 | 19 | 14 | 12 | 7  | 9  | 7  | 6  | 8 |
| 8  | 13 | 21 | 18 | 11 | 3  |    |    |    |   |
| 10 | 16 | 25 | 13 | 11 | 8  |    |    |    |   |
| 6  | 13 | 20 | 18 | 18 | 9  |    |    |    |   |
| 10 | 16 | 25 | 26 | 19 | 9  |    |    |    |   |
| 8  | 14 | 16 | 17 | 18 | 13 | 6  | 8  | 6  | 4 |
| 6  | 7  | 7  | 9  | 9  | 5  | 8  | 9  | 6  | 9 |

FIG. 20

|   |   |   | 0 | 0 | 0 | 0 | 0 | 0 | 0 | 0 |
|---|---|---|---|---|---|---|---|---|---|---|
|   |   | 0 | 1 | 1 | 1 | 1 | 1 | 1 | 0 |   |
|   |   | 0 | 1 | . | . | 1 | 1 | 1 | 0 |   |
| 0 | 0 | 1 | . | . | 1 | 0 | 0 | 0 |   |   |
| 0 | 1 | . | . | 1 | 0 |   |   |   |   |   |
| 0 | 1 | . | . | 1 | 0 |   |   |   |   |   |
| 0 | 1 | . | . | 1 | 0 |   |   |   |   |   |
| 0 | 1 | . | . | 1 | 0 |   |   |   |   |   |
| 0 | 1 | 1 | 1 | 1 | 1 | 0 | 0 | 0 | 0 |   |
| 0 | 0 | 0 | 0 | 0 | 0 | 0 | 0 | 0 | 0 |   |

FIG. 21

|   |   |   | 1 | 1 | 1 | 1 | 1 | 1 | 1 | 1 |
|---|---|---|---|---|---|---|---|---|---|---|
|   |   | 1 | 2 | 2 | 2 | 2 | 2 | 2 | 1 |   |
|   |   | 1 | 2 | . | . | 2 | 2 | 2 | 1 |   |
| 1 | 1 | 2 | . | . | 2 | 1 | 1 | 1 |   |   |
| 1 | 2 | . | . | 2 | 1 |   |   |   |   |   |
| 1 | 2 | . | . | 2 | 1 |   |   |   |   |   |
| 1 | 2 | . | . | 2 | 1 |   |   |   |   |   |
| 1 | 2 | . | . | 2 | 1 |   |   |   |   |   |
| 1 | 2 | 2 | 2 | 2 | 2 | 1 | 1 | 1 | 1 |   |
| 1 | 1 | 1 | 1 | 1 | 1 | 1 | 1 | 1 | 1 |   |

FIG. 22

|   |   | 0 | 0 | 0 | 0 | 0 | 0 | 0 | 0 |
|---|---|---|---|---|---|---|---|---|---|
|   |   | 0 | 1 | 1 | 1 | 1 | 1 | 1 | 0 |
|   |   | 0 | 1 | 2 | 2 | 1 | 1 | 1 | 0 |
| 0 | 0 | 1 | 2 | 2 | 1 | 0 | 0 | 0 | 0 |
| 0 | 1 | 2 | 2 | 1 | 0 |   |   |   |   |
| 0 | 1 | 2 | 2 | 1 | 0 |   |   |   |   |
| 0 | 1 | 2 | 2 | 1 | 0 |   |   |   |   |
| 0 | 1 | 2 | 2 | 1 | 0 |   |   |   |   |
| 0 | 1 | 1 | 1 | 1 | 1 | 0 | 0 | 0 | 0 |
| 0 | 0 | 0 | 0 | 0 | 0 | 0 | 0 | 0 | 0 |

FIG. 23

|   |   | 1 | 1 | 1 | 1 | 1 | 1 | 1 | 1 |
|---|---|---|---|---|---|---|---|---|---|
|   |   | 1 | 2 | 2 | 2 | 2 | 2 | 2 | 1 |
|   |   | 1 | 2 | 3 | 3 | 2 | 2 | 2 | 1 |
| 1 | 1 | 2 | 3 | 3 | 2 | 1 | 1 | 1 | 1 |
| 1 | 2 | 3 | 3 | 2 | 1 |   |   |   |   |
| 1 | 2 | 3 | 3 | 2 | 1 |   |   |   |   |
| 1 | 2 | 3 | 3 | 2 | 1 |   |   |   |   |
| 1 | 2 | 3 | 3 | 2 | 1 |   |   |   |   |
| 1 | 2 | 2 | 2 | 2 | 2 | 1 | 1 | 1 | 1 |
| 1 | 1 | 1 | 1 | 1 | 1 | 1 | 1 | 1 | 1 |

FIG. 24

|   |   | 0 | 0 | 0 | 0 | 0 | 0 | 0 | 0 |
|---|---|---|---|---|---|---|---|---|---|
|   |   | 0 | 1 | 1 | 1 | 1 | 1 | 1 | 0 |
|   |   | 0 | 1 | 2 | 2 | 1 | 1 | 1 | 0 |
| 0 | 0 | 1 | 2 | 2 | 1 | 0 | 0 | 0 | 0 |
| 0 | 1 | 2 | 2 | 1 | 0 |   |   |   |   |
| 0 | 1 | 2 | 2 | 1 | 0 |   |   |   |   |
| 0 | 1 | 2 | 2 | 1 | 0 |   |   |   |   |
| 0 | 1 | 2 | 2 | 1 | 0 |   |   |   |   |
| 0 | 1 | 1 | 1 | 1 | 1 | 0 | 0 | 0 | 0 |
| 0 | 0 | 0 | 0 | 0 | 0 | 0 | 0 | 0 | 0 |

FIG. 25

|   |   | 1 | 1 | 1 | 1 | 1 | 1 | 1 | 1 |
|---|---|---|---|---|---|---|---|---|---|
|   |   | 1 | 2 | 2 | 2 | 2 | 2 | 2 | 1 |
|   |   | 1 | 2 | 3 | 3 | 2 | 2 | 2 | 1 |
| 1 | 1 | 2 | 3 | 3 | 2 | 1 | 1 | 1 | 1 |
| 1 | 2 | 3 | 3 | 2 | 1 |   |   |   |   |
| 1 | 2 | 3 | 3 | 2 | 1 |   |   |   |   |
| 1 | 2 | 3 | 3 | 2 | 1 |   |   |   |   |
| 1 | 2 | 3 | 3 | 2 | 1 |   |   |   |   |
| 1 | 2 | 2 | 2 | 2 | 2 | 1 | 1 | 1 | 1 |
| 1 | 1 | 1 | 1 | 1 | 1 | 1 | 1 | 1 | 1 |

IMAGE PROCESSING METHOD

FIELD OF THE INVENTION

This invention relates to an image processing method particularly to distance transformation, skeltonizing, density-weighted distance transformation and density-weighted skeltonizing.

BACKGROUND OF THE INVENTION

Distance transformation and density-weighted distance transformation are supposed to be the best ways to compress image data or to extract characteristics of images. There are two types of the above processes: sequential process and parallel process. Since the sequential process is difficult to perform by hardware, it cannot be performed in high speed. The parallel process has disadvantages in that the distance value is biased according to scanning direction when processed by one scanning. So parallel process needs multiple scanning.

For example, as to the image of 4×4 pixels in FIG. 1, when a parallel process with 3×3 convolutions is performed, the hatched pixel of coordinate (3,3) is given a distance value of "3" according to the distance from boundaries of upper and left sides. The distance from the right side boundary cannot be found by one scanning. However, the distance of this pixel is "2" from boundaries of right and lower side: this means that a bias is arisen from the scanning direction. For improving this disadvantage, one more scanning is necessary. This means that the bigger an image is, the more the number of scanning increases.

SUMMARY OF THE INVENTION

The present invention has an object to provide an image processing method for distance transformations easily performed by a hardware in high speed.

According to the present invention, the density-weighted distance transformation is performed, when the background density is "0" for example, a center pixel in each convolution is given a minimal density in the convolution, then the processed image is added to the original image for each corresponding pixel. Such steps are repeated. Therefore, evaluation of density and evaluation of distance are independently performed from each other so that the process is simplified and the convergence speed is improved. While in the distance transformation, boundary pixels are given a distance value "n" in the nth scanning and pixels already given a distance are assumed to be a background pixels in the scanning thereafter. Simplicity and high processing speed are obtained.

BRIEF DESCRIPTION OF THE DRAWINGS

FIG. 3 shows the result of binarizing of the image in FIG. 2;

FIG. 4, FIG. 6, FIG. 8, FIG. 10, FIG. 12, FIG. 14 and FIG. 16 are the results of "the transformation of center pixel to the minimal density in 4-neighborhoods with respect to images in FIG. 3, FIG. 5, FIG. 7, FIG. 9, FIG. 11, FIG. 13 and FIG. 15, respectively;

FIG. 5, FIG. 7, FIG. 9, FIG. 11, FIG. 13, FIG. 15 and FIG. 17 are the results of "fixing addition" performed on the images in FIG. 4, FIG. 6, FIG. 8, FIG. 10, FIG. 12, FIG. 14 and FIG. 16, respectively;

FIG. 21, FIG. 23 and FIG. 25 show the process result after first scanning for "fixing addition";

FIG. 20, FIG. 22 and FIG. 24 show the process result from the second to the fourth scanning for "transformations of center pixel to the minimal density in 4-neighborhoods";

DETAILED DESCRIPTION OF THE PREFERRED EMBODIMENT

The first embodiment of the image processing method according to the present invention for density-weighted distance transformation is described below referring to attached drawings. In this embodiment, the process of 4-neighborhoods is performed under the conditions of a background density of "0", while the densities of pixels in a configuration are "1" or more than "1".

Figures 1, 2:
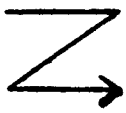
FIG. 1 shows a directionally-biased distance transformation.
FIG. 2 shows an image to be processed by an embodiment of density-weighted distance transformation of the present invention.

FIG. 2 shows an example of an image to be processed: the processes to be performed for the image will be mentioned referring to FIGS. 3 to 17.

a) Binarizing

When distance values are given as density values to each pixel, the distance must be distinguished from the density of the original image. The pixels of the original image are transformed to the maximal density value (255 is the maximal density in 8 bits) and background pixels are "0" as they were because the distance is necessary to be distinguished from the original one: this is the binarizing performed there.

Figures 3, 4:
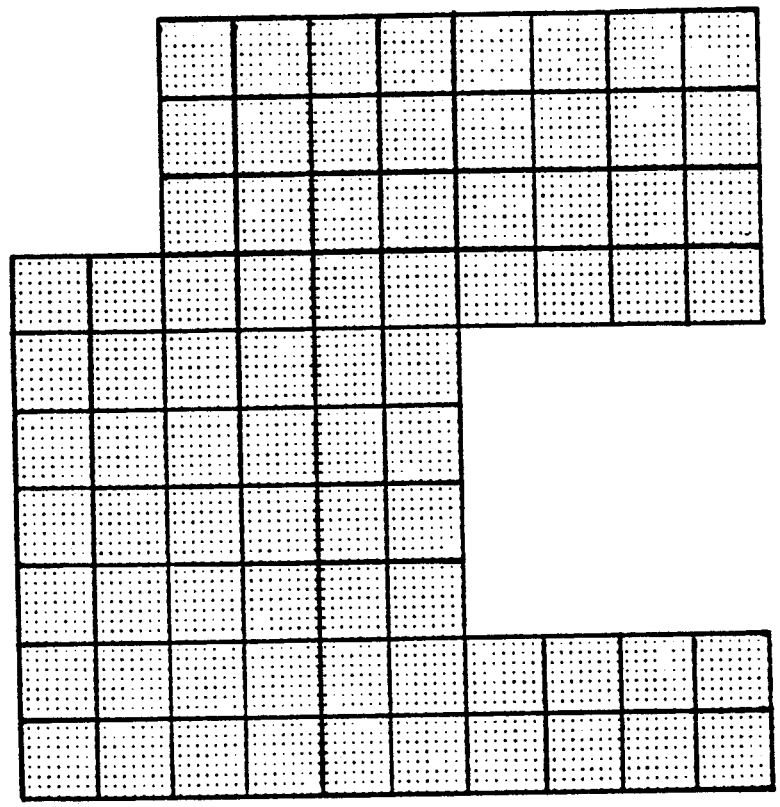
Figure 18:
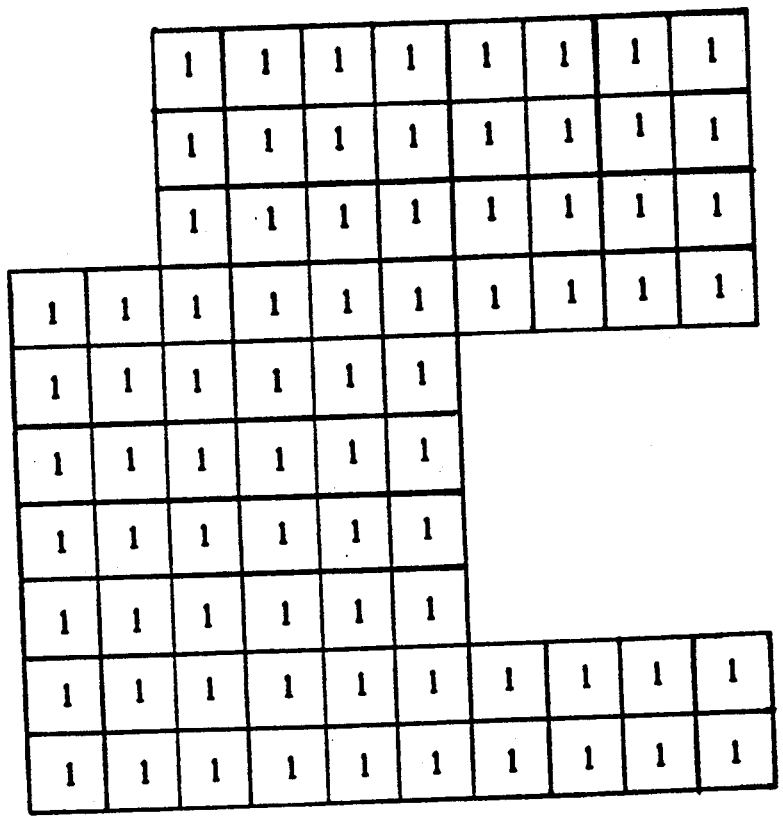
FIG. 18 shows an image to be processed by a second embodiment.

The binarizing image is transformed as shown in FIG. 3; the maximal density is given to all pixels hatched. In this case, the original image is held in a memory as it is and the binarized image is written in another memory.

b) Transformation into the minimal density

In 3×3 convolutions, the minimal density (except for the density of the center pixel) is selected and, the density of the center pixel is changed to the selected minimal density. The process result is shown in FIG. 4: the density of "0" of background pixels is given to boundary pixels and other pixels have the maximal density "255".

Factors of distance from the boundary to each pixel are evaluated through this process.

c) Adding the process result with the original image

Next, the image in FIG. 4 is added to the original image in FIG. 2. In this addition, a so-called FIX process is performed, that is, the addition result is deemed to be the maximal density when the additional result exceeds the maximal density. The maximal density becomes an indicator of pixels incompletely processed.

The process result is shown in FIG. 5.

The corresponding pixel values of the original image are added to the pixels which had densities of "0" in FIG. 4, while other pixels in FIG. 4 retain the value of "255" (as shown by hatching).

d) Repetition of process b) and c)

Similar to the process b), each pixel in the image of FIG. 5 is given a minimal density in 4-neighborhoods. The process result is shown in FIG. 6. As can be seen by inspection, a 4-neighborhood consists of 4 pixels immediately adjacent to a center pixel in vertical and horizontal directions. The process result is added (with fixing) with the original image. The process result is shown in FIG. 7. These processess are repeated, alternately.

The process results are shown in the order of FIG. 8 (Transformation of center pixels into minimal density in 4-neighborhoods)→FIG. 9 (fixing addition)→FIG. 10 (Transformation of center pixels to the minimal density in 4-neighborhoods)→FIG. 11 (fixing addition)→FIG. 12 (Transformation of center pixels to the minimal density in 4-neighborhoods)→FIG. 13 (fixing addition)-→FIG. 14 (Transformation of center pixels to the minimal density in 4-neighborhoods)→FIG. 15 (fixing addition)→FIG. 16 (Transformation of center pixels to the minimal density in 4-neighborhoods)→FIG. 17 (fixing addition)

e) Discrimination of conclusion condition

The process described above is completed when a process result coincides with the previous process result. For example in FIG. 11, the hatched 5 pixels are different from the result of the previous process (FIG. 9). In FIG. 13, hatched 4 pixels are different from the result of the previous process (FIG. 11). In FIG. 15, hatched 3 pixels are different from the result of the previous process (FIG. 13). The disagreements of process results are mainly caused by the existence of local density minimum in a image. Successive process results agree with each other only when the correct values of distances are obtained.

In this embodiment, the process result of FIG. 17, after the fourteenth scanning, agrees with the previous process result (FIG. 15): it becomes clear that the process can be concluded.

It will easily understood that each of the above process is simple and parallel (no sequential), easy to be performed by hardware, and that the number of scans necessary for processing is fewer than that of the conventional method. The number of scans is estimated (2n+2) when the maximal width of an image is "n" pixels.

The conclusion condition can be discriminated by the agreement of the process result to the previous process result of the image which is transformed into minimal density in 4-neighborhoods (step b above), but not processed by fixing addition.

The processes above converge in extremely high speed and need few scans unless there is a local minimum density in a image.

FIGS. 18 to 24 show the process when the pixels in the configuration in FIG. 2 instead have a flat density of "1".

Figure 19:
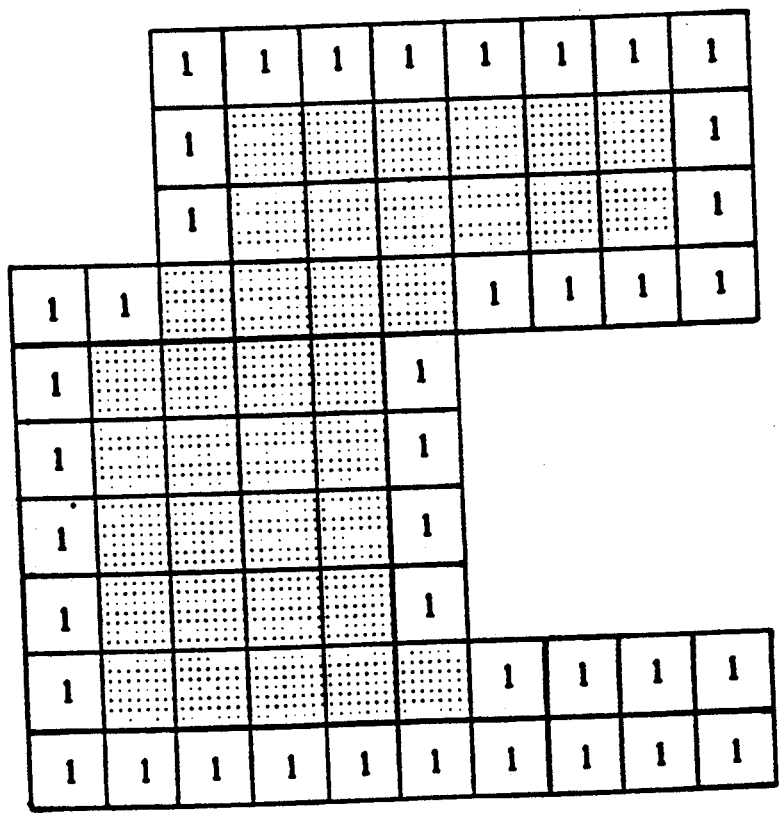
FIG. 19 shows the process result of "fixing addition" in the first scanning.

After binarizing similarly in FIG. 3 and transforming the center pixels to the minimal density in 4-neighborhoods, processes are advanced as shown in FIG. 19 (fixing addition)→FIG. 20 (Transforming of center pixels to the minimal density in 4-neighborhoods)-→FIG. 21 (fixing addition)→FIG. 22 (Transforming of center pixels to the minimal density in 4-neighborhoods)→FIG. 23 (fixing addition)→FIG. 24 (Transforming of center pixels to the minimal density in 4-neighborhoods)→FIG. 25 (fixing addition). Since the process result of FIG. 25 and the previous process result (FIG. 23) agree to each other, the process is concluded with 9 times scannings.

The condition for conclusion decision can be found out by comparing successive process results, the previous one and the current one. It is easily performed by hardware.

The background pixels of embodiments described above is "0". As for the reversed imaged whose background pixels are "255", a similar process to the above embodiment can be applied after binarizing the configuration pixels to "0", instead of binarizing shown in FIG. 3, then repeating the processes of 1) giving the maximal density in 4-neighborhoods to be the center pixel therein and 2) fixing subtraction, that is, subtracting corresponding pixel densities of the original image from the converted density values of the center pixel and limiting the subtraction result to zero. The same processing as the above may be performed, after creating a reversed image.

The above embodiment is a process concerning to 4-neighborhoods. With respect to 8-neighborhoods, "the minimal density of 8-neighborhood" is given to the center pixel.

Figure 26:
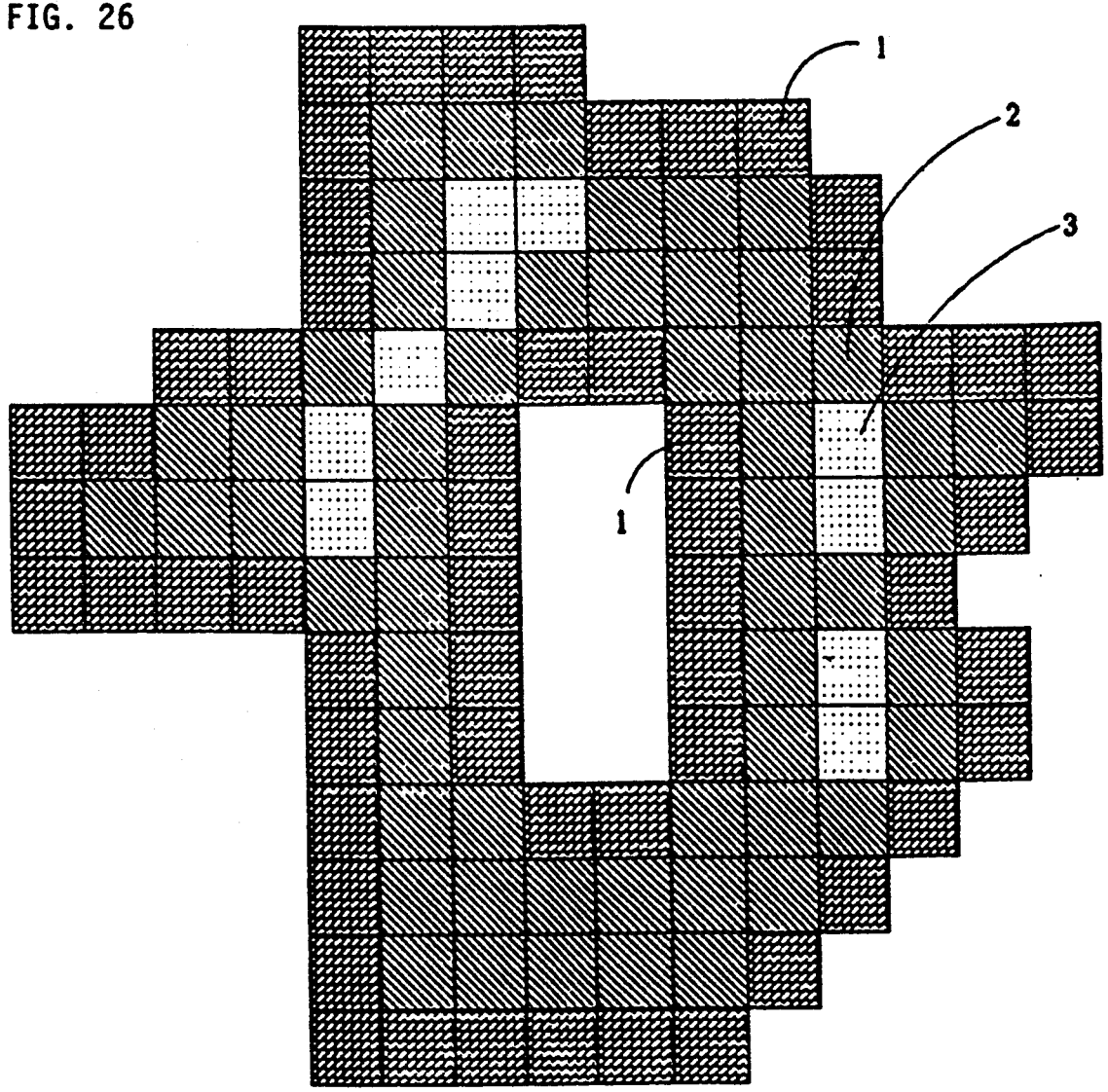
FIG. 26 shows the process result of the first embodiment of distance transformation according to the present invention.

FIG. 26 shows the result of distance transformation. An embodiment of the process method is mentioned below.

In this embodiment, the process of 4-neighborhoods are performed under the condition that the density of the background pixels is "0" and the density of the configuration pixels are "1" or more.

a) Binarizing

For the discrimination of unprocessed pixels, binarizing is performed by giving the configuration pixels a density rarely used as a distance, for example "255".

b) Process for boundary pixels

Extracting boundary pixels (i.e., a pixel whose denisty is "255" and which is adjacent to a pixel of density "0"). Boundary pixels are given the number of scans as densities—the density given to boundary pixel on first scan is "1". In the process of 4-neighborhoods, the condition of extracting boundary pixels is the condition of 4-neighborhoods; in 8-neighborhoods process, the condition of extracting boundary pixels is the condition of 8-neighborhoods.

c) Repetition of b)

Process b) is repeated, giving the distances to the more inner pixels of a configuration, sequentially.

d) Condition of conclusion

Conclusion can be decided when no boundary pixel is found in the scan, or when a process result of scanning agrees with the result of the previous scan.

Figure 27:
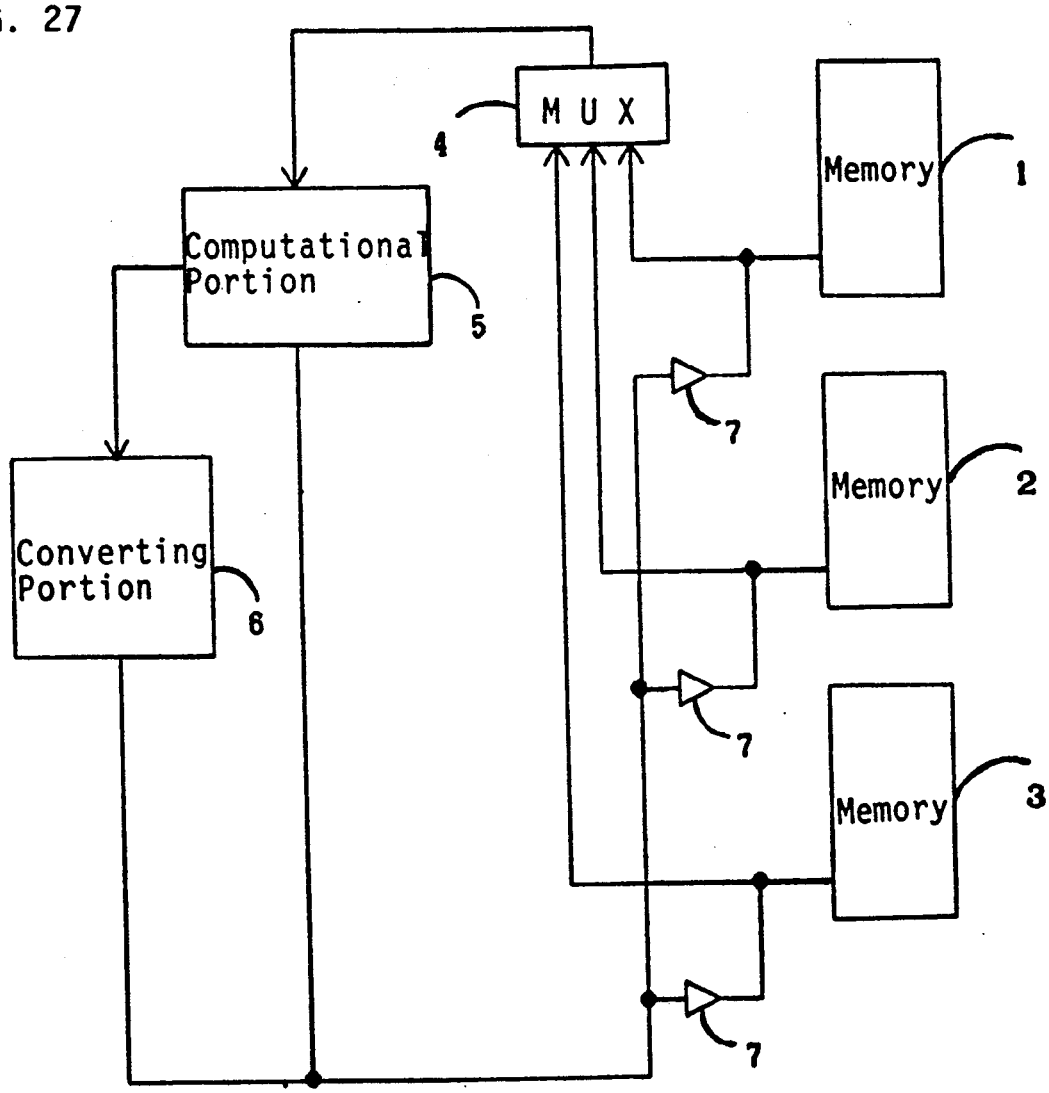
FIG. 27 shows a block diagram of an example of an image processing system which can be used for this invention.

FIG. 27 shows an embodiment of an image processing system by which the above image processing method can be performed. This system comprises a plurality of frame memories 1 to 3 connected to a computational portion 5 through a multiplexer 4. The output of the computational portion 5 is transmitted to one of the memories 1 to 3. The computational portion 5 performs calculation processes, e.g., calculations between images, fixing subtraction, selecting the minimal or maximal density in 4-neighborhoods etc., and status decisions of boundary pixels decision etc. The output of status decisions in the calculation portion are input to the converting portion 6, and the output of converting portion 6 is transmitted to the memories 1 to 3. The converting portion 6 outputs the results of the density conversions of each pixel according to the output of status decision of the calculation portion 5. The outputs of calculation portion 5 and converting portion 6 are connected to the memories 1 to 3 through bus buffer 7, and the output data is written in one of the memories.

When this image processing system is applied to the previous embodiment, each configuration pixel is given the maximal density by binarizing by means of the converting portion 6 in which a threshold is registered. As to "the transformation of the center pixels to the minimal density in 4-neighborhoods" of FIG. 4, FIG. 6, FIG. 8, FIG. 10, FIG. 12, FIG. 14 and FIG. 16, minimal densities are calculated through MIN calculations in the computational portion 5. Similarly, fixing addition is performed in the computational portion 5. During these processes, when the original image is held in memory 1 and the result of fixing addition is written in another memory 2, for example, the result of the transformation of a center pixel to the minimal density in the next 4-neighborhoods is written in the memory 3. The result of fixing addition of the image (in memory 3) with the original image (in memory 1) is written in the same memory 3. The calculation between images for a conclusion judgment is performed in computational portion 5, and the number of inequalities of corresponding pixels is registered, for example, in converting portion 6. The conclusion judgment is performed by a device such as MPU, which reads the number of inequalities of pixels from the converting portion 6.

In the processing of the embodiment in FIG. 26, the converting portion 6 is used similarly as above for binarizing, then, boundary pixels are found in the computational portion 5 and the result of boundary pixel extraction is input to converting portion 6. In converting portion 6, the number of scans registered in advance is output and written in the memory when this decision for boundary pixel is "truth".

Although only a few exemplary embodiments of this invention have been described in detail above, those skilled in the art will readily appreciate that many modifications are possible in the exemplary embodiments without materially departing frm the novel teachings and advantages of this invention.

Accordingly, all such modification are intended to be included within the scope of this invention as defined in the following claims.

What is claimed is:

1. An image processing method for density-weighted distance transformation, comprising steps of:
    storing an original image;
    generating an index image by replacing pixels having a configuration density with a first selected value and other pixels with a zero value when a background density is lower than a configuration density;
    generating a minimum-processed image by replacing a pixel in said index image with a minimum value of surrounding pixels in a neighborhood;
    generating a first addition-fixed image by adding pixel values of said minimum-processed image to corresponding pixel values of said original image, and limiting the addition result to said first selected value;
    generating a second minimum-processed image by replacing a pixel in said addition-fixed image with a minimum value of surrounding pixels in a neighborhood; and
    generating a second addition-fixed image by adding pixel values of said second minimum-processed image to corresponding pixel values of said original image.

2. An image processing method according to claim 1, wherein said neighborhood comprises four pixels adjacent to a center pixel, two of said adjacent pixels being horizontally adjacent to the center pixel in the image, two of said adjacent pixels being vertically adjacent to said center pixel.

3. An image processing method according to claim 1, wherein said neighborhood comprises eight pixels adjacent to a center pixel, two of said adjacent pixels being horizontally adjacent to the center pixel in the image, two of said adjacent pixels being vertically adjacent to said center pixel and four of said adjacent pixels being diagonally adjacent to the center pixel.

4. A method as in claim 1 further comprising steps of generating a plurality of minimum-processed and addition-fixed images until an addition-fixed image is substantially identical to a previously generated addition-fixed image.

5. An image processing method for density-weighted distance transformation comprising steps of:
    storing an original image;
    generating an index image by replacing pixels having a configuration density with zero and other pixels with a first selected value when a background density is higher than a configuration density;
    generating a first maximum-processed image by replacing a pixel in said index image with a maximum value of surrounding pixels in a neighborhood;
    generating a first subtraction-fixed image by subtracting corresponding pixel values of said original image from corresponding pixel values of said maximum-processed image;
    generating a second maximum-processed image by replacing a pixel in said subtraction-fixed image with a maximum value of surrounding pixels in a neighborhood; and
    generating a second subtraction-fixed image by subtracting pixel values of said original image from corresponding pixel values of said second maximum processed image.

6. An image processing method according to claim 5, wherein said neighborhood comprises four pixels adjacent to a center pixel, two of said adjacent pixels being horizontally adjacent to the center pixel in the image, two of said adjacent pixels being vertically adjacent to said center pixel.

7. An image processing method according to claim 5, wherein said neighborhood comprises eight pixels adjacent to a center pixel, two of said adjacent pixels being horizontally adjacent to the center pixel in the image, two of said adjacent pixels being vertically adjacent to said center pixel and four of said adjacent pixels being diagonally adjacent to the center pixel.

8. A method as in claim 5 further comprising steps of generating a plurality of maximum-processed and subtraction-fixed images until a subtraction-fixed image is substantially identical to a previously generated subtraction-fixed image.

9. An image processing method for distance transformation of an image having configuration pixels all of the same density comprising steps of:
    storing an original image;
    generating an index image by replacing pixels having a configuration density with a first selected value and other pixels with a zero value when a background density is lower than a configuration density;

generating a first minimum-processed image by replacing a pixel in said index image with a minimum value of surrounding pixels in a neighborhood;

generating a first addition-fixed image by adding pixel values of said minimum-processed image to corresponding pixel values of said original image;

generating a second minimum-processed image by replacing a pixel in said addition-fixed image with a minimum value of surrounding pixels in a neighborhood; and generating a second addition-fixed image by adding pixel values of said second minimum-processed image to corresponding pixel values of said original image.

10. A method as in claim 9 further comprising steps of generating a plurality of minimum-processed and addition-fixed images until an addition-fixed image is substantially identical to a previously generated addition-fixed image.

11. A method as in claim 9 further comprising steps of generating a plurality of minimum-processed and addition-fixed images until an addition-fixed image does not contain any pixel which has the first selected value and is adjacent to a pixel not having the first selected value.

* * * * *